(12) United States Patent
Carberry et al.

(10) Patent No.: US 8,176,828 B2
(45) Date of Patent: May 15, 2012

(54) GLASS-CERAMIC WITH LAMINATES

(75) Inventors: John Carberry, Talbott, TN (US); John Boyett, Garnet Valley, PA (US); Carl Cline, Danville, CA (US); Marcella Mirata, Livermore, CA (US); Katherine T. Leighton, Newark, DE (US); Wiktor Serafin, Boothwyn, PA (US); Edgar Aleshire, Elkton, MD (US)

(73) Assignee: Schott Corporation, Elmsford, NY (US)

( * ) Notice: Subject to any disclaimer, the term of this patent is extended or adjusted under 35 U.S.C. 154(b) by 269 days.

(21) Appl. No.: 12/349,832

(22) Filed: Jan. 7, 2009

(65) Prior Publication Data

US 2009/0217813 A1    Sep. 3, 2009

Related U.S. Application Data

(63) Continuation-in-part of application No. 11/689,299, filed on Mar. 21, 2007.

(51) Int. Cl.
*F41H 5/04* (2006.01)
(52) U.S. Cl. .......................... 89/36.02; 89/905
(58) Field of Classification Search ............ 89/36.02, 89/36.01
See application file for complete search history.

(56) References Cited

U.S. PATENT DOCUMENTS

| | | | | |
|---|---|---|---|---|
| 2,391,353 A | * | 12/1945 | Sheridan | 428/682 |
| 3,573,150 A | * | 3/1971 | Broutman et al. | 428/105 |
| 3,671,374 A | | 6/1972 | Kolarik | 161/93 |
| 4,028,476 A | | 6/1977 | Kleinschmidt et al. | 428/220 |
| 4,473,653 A | * | 9/1984 | Rudoi | 501/4 |
| 4,494,342 A | * | 1/1985 | Decker | 52/203 |
| 4,704,943 A | * | 11/1987 | McDougal | 89/36.02 |
| 4,869,175 A | | 9/1989 | McDougal | |
| 5,060,553 A | | 10/1991 | Jones | 89/36.02 |
| 5,502,011 A | | 3/1996 | Yamamoto et al. | |
| H1567 H | | 8/1996 | Parsons et al. | 89/36.02 |
| 5,567,529 A | * | 10/1996 | Smith | 428/425.6 |
| 5,783,297 A | | 7/1998 | Wise et al. | |
| 5,952,253 A | | 9/1999 | Dejneka et al. | 501/3 |

(Continued)

FOREIGN PATENT DOCUMENTS

GB    2 284 655    6/1995

(Continued)

OTHER PUBLICATIONS

International Search Report dated Apr. 20, 2010 for PCT/US10/000033.

(Continued)

*Primary Examiner* — Bret Hayes
(74) *Attorney, Agent, or Firm* — Ohlandt, Greeley, Ruggiero & Perle, LLP

(57) ABSTRACT

A transparent armor system includes a hard face fabricated from a substantially transparent glass-ceramic material exhibiting crystalline bodies throughout the mass of the glass-ceramic material and a backing covering a rear surface of the hard face opposite an anticipated incoming projectile. The backing has a refractive index substantially matching that of the hard face such as to allow substantial transparency of the transparent armor system. The hard face serves to disburse energy caused by the impact of an incoming projectile with the transparent armor system, while the backing serves to retain any pieces of the hard face fractured during ballistic impact. In certain embodiments, a plurality of hard faces are held in parallel and spaced apart arrangement.

12 Claims, 11 Drawing Sheets

U.S. PATENT DOCUMENTS

| | | | |
|---|---|---|---|
| 6,197,429 B1 * | 3/2001 | Lapp et al. | 428/450 |
| 6,334,382 B2 | 1/2002 | Gourio | 89/36.02 |
| 6,708,595 B1 * | 3/2004 | Chaussade et al. | 89/36.02 |
| 6,862,970 B2 | 3/2005 | Aghajanian et al. | |
| 6,895,851 B1 | 5/2005 | Adams et al. | |
| 6,995,103 B2 | 2/2006 | Aghajanian | |
| 7,104,177 B1 | 9/2006 | Aghajanian et al. | |
| 7,147,544 B2 | 12/2006 | Rosenflanz | 451/28 |
| 7,157,149 B2 | 1/2007 | Belykh et al. | 428/469 |
| 2002/0183187 A1 * | 12/2002 | Siebers et al. | 501/4 |
| 2003/0035917 A1 | 2/2003 | Hyman | 428/67 |
| 2004/0157720 A1 | 8/2004 | Sakamoto et al. | |
| 2005/0119104 A1 | 6/2005 | Alexander et al. | |
| 2005/0135724 A1 | 6/2005 | Helvajian et al. | |
| 2007/0060465 A1 * | 3/2007 | Varshneya et al. | 501/68 |
| 2007/0068375 A1 * | 3/2007 | Jones et al. | 89/36.02 |
| 2007/0068376 A1 | 3/2007 | Jones et al. | 89/36.02 |
| 2008/0092729 A1 | 4/2008 | Cook | 89/36.02 |
| 2008/0264244 A1 | 10/2008 | Ravid et al. | 89/36.02 |
| 2008/0280034 A1 | 11/2008 | Mathis et al. | 427/137 |

FOREIGN PATENT DOCUMENTS

| | | |
|---|---|---|
| GB | 2284655 A * | 6/1995 |
| WO | WO03/022767 | 3/2003 |
| WO | WO2006/135832 | 12/2006 |

OTHER PUBLICATIONS

Burge et al.; "*Thermal Expansion of Borosilicate Glass, Zerodur, Zerodur M, and Unceramized Zerodur at Low Temperatures*"; Applied Optics; vol. 38, Issue 34; pp. 7161-7192 (1999).

U.S. Appl. No. 11/689,299, filed Jan. 7, 2009, Carberry et al.

* cited by examiner

GLASS-CERAMIC WITH LAMINATES

CROSS-REFERENCE TO RELATED APPLICATIONS

This application is a Continuation-In-Part of U.S. application Ser. No. 11/689,299, filed Mar. 21, 2007.

STATEMENT REGARDING FEDERALLY-SPONSORED RESEARCH OR DEVELOPMENT

Not Applicable

BACKGROUND OF THE INVENTION

1. Field of Invention

This invention relates to ballistic armor. More specifically, this invention relates to a transparent armor system utilizing a multi-layer structure incorporating glass-ceramics and laminates.

2. Description of the Related Art

In order to provide protection of personnel and equipment from ballistic projectiles, explosive ordnance, and forces and objects from detonation of improvised explosive devices (collectively hereinafter "projectiles"), it is necessary to provide a means of disbursing the kinetic energy of such projectiles to prevent them from reaching their target. Although this may be accomplished by interposing a large mass of any of a number of different materials between the target and the incoming projectile, experience has shown that a much more efficient means of energy disbursement is provided by suitably engineered ballistic armor structures wherein layers of different materials act to disrupt and disperse the energy of an incoming projectile. Such structures strive to maximize the amount of material which may be acted upon to absorb and disburse the energy of the projectile, while at the same time breaking or deforming the projectile and distributing these resulting fragments into a wider area. Such structures further strive to minimize the total amount of materials required for the protection of a specific area.

Ballistic armor structures generally contain one or more layers of material engineered to spread the force of the impact by deforming, deflecting, or fragmenting the ballistic projectile while the ballistic armor itself undergoes deformation or localized fragmentation. The deformation and localized fragmentation processes of the ballistic armor structure absorb a large portion of energy from the projectile while simultaneously spreading the impacted area to involve more material in successive layers. Both hardness and toughness of the ballistic armor structure are required for these functions.

In the field of ballistic armor structures, the initial layer of material used to disrupt the incoming ballistic projectile is often referred to as the "strike face," or alternatively, the "hard face." The hard face is typically a layer of relatively hard and tough material designed to deform, and in some cases fragment, to absorb at least some of the energy of the incoming projectile, thereby distributing the projectile's energy. Following the hard face are other layers specifically designed to absorb the remaining energy of the impacting material and pieces of the previous hard face. These layers are often referred to as the "backing" or "catcher."

The process of energy absorption and disbursement of the incoming projectile by the ballistic armor structure is generally intended to result in deformation, displacement and/or localized fracture of the hard face, and deformation and/or displacement of the backing, but without penetration through the ballistic armor structure by any fragments of the ballistic projectile. Selection of materials for these distinct functions and careful attention to construction and coupling of the various layers is essential to optimizing performance of the ballistic armor structure.

Great advances have been made in selection of materials for optimizing the performance of ballistic armor structures. Use of high-strength, hard, and in some cases "tough" ceramics like aluminum oxide, boron carbide, titanium diboride and silicon carbide for the hard face; and rigid or soft laminates of fibrous materials such as fiberglass, aramid, or polyethylene fiber for the backing have greatly reduced the mass and bulk of protective structures. These advances, unfortunately, have not been readily applicable to those areas where a transparent protective structure is required. Neither the high-strength, hard ceramics nor the laminated fibrous backing materials are typically transparent, and so neither are adaptable to transparent protective structures.

The need for transparency severely limits possible choices of materials for fabrication of the hard face of transparent protective systems. Although recent advances have been demonstrated in use of hot-pressed spinel or aluminum oxynitride (ALON) ceramics, or melt grown aluminum oxide (sapphire) crystal sheets for the hard face, manufacturing cost and size limitations would seem to restrict their use in all but the most critical of situations. The standard material used for fabrication of the hard face in transparent structures is borosilicate float glass or soda lime glass, a material which is neither very hard, nor very tough, and which has a relatively high specific density. This results in the need to greatly increase the aerial mass and bulk of transparent armors in order to preserve effectiveness. Such increase in aerial mass and bulk ultimately results in a conventional transparent armor having an increased weight per level of protection provided by the transparent armor.

A similar situation exists in regard to the materials used in the backing layers. The fibrous laminates traditionally used in the backing layers of ballistic armor structures are not transparent. Traditional backing and fragment catching layers for transparent armor are predominately un-reinforced sheets of polyacrylic or polycarbonate polymer, although some advances have been made in the use of optimized copolymer compositions for these layers. Thus, for most transparent armor applications, the chosen solution is the same as that which has been used for decades, a hard face of multiple layers of borosilicate float glass with a backup layer or layers of a polymer sheet to catch fragments, bound together with a conventional transparent adhesive.

Recent developments in the requirements and testing standards for transparent armor systems for use by the United States military, police, and other such organizations have introduced a need for transparent armor having an increased ability to protect against multiple subsequent impacts from multiple projectiles. For example, under the purchase specification ATPD 2352, published on Jul. 7, 2008 for use by the Department of the Army and the Department of Defense, transparent armor for use by the United States army must be capable of stopping a series of four shots of a specific rifle ammunition, with each shot impacting at a different location on the transparent armor system, without allowing penetration of any of the four shots through the transparent armor system. These new testing standards have resulted in the need to greatly increase the aerial mass and bulk of conventional transparent armor designs in order to allow such conventional transparent armor materials to meet the demands imposed by the new requirements and testing standards.

Moreover, several of the recently adopted requirements and testing standards relating to transparent armor use by the United States military require the use of transparent armor which is capable of withstanding subjection to ultraviolet radiation with minimal degradation of the transparent armor. Indeed, in several transparent armor applications, there is a need to use transparent armor in an environment in which the transparent armor is subjected to ultraviolet radiation, such as in vehicle windows and the exterior windows of a building. Ultraviolet radiation is harmful to conventional transparent adhesives used to bind a transparent hard face to the backup layer, with prolonged exposure resulting in degradation of the transparent adhesive. Conventional borosilicate float glass and soda lime glass structures are transparent to ultraviolet radiation, thereby allowing ultraviolet radiation to penetrate the hard face and contact the adhesive binding. The ultimate effect is that conventional transparent armor exhibits discoloration and delamination under prolonged exposure to ultraviolet radiation, such as in prolonged outdoor conditions.

There is a further requirement and need in several transparent armor applications to use transparent armor in an environment in which the transparent armor is subjected to extremes of temperature, for instance, in desert conditions. In some desert areas, nighttime temperatures can often fall well below freezing, and daytime temperatures inside an enclosed vehicle can exceed 85 degrees Centigrade (185 degrees Fahrenheit). In conventional transparent armor, differences in thermal expansion properties of the various layers of material can lead to delamination of the transparent armor when subjected to extreme changes in temperature.

BRIEF SUMMARY OF THE INVENTION

A transparent armor system for limiting the transfer of impact force from a projectile and method of manufacture is disclosed herein. The transparent armor system includes a hard face and a resilient layer covering at least one surface of the hard face.

The hard face is defined by a layer fabricated from a glass-ceramic substance having a hardness and compressive strength, both in dynamic conditions and standard temperature and pressure conditions, sufficient to substantially absorb at least a portion of the impact from an incoming projectile. The resilient layer is a layer selected to have a sufficient thickness and strength to withstand stresses imparted to the resilient layer under ballistic impact of the hard face. Furthermore, the resilient layer is selected to have a refractive index sufficiently similar to the refractive index of the hard face such that the transparent armor system is substantially transparent. In certain embodiments, the resilient layer is fabricated from a polymer material.

In one embodiment, at least one reinforcing layer is disposed behind the hard face opposite the incoming projectile. The reinforcing layers are each fabricated from a glass-ceramic substance having a hardness and compressive strength sufficient to substantially absorb at least a portion of the impact from an incoming projectile. In one embodiment, one resilient layer defines a covering and is laminated to a front surface of the hard face. Another resilient layer defines a backing and is laminated to a rear surface of the hard face. The covering cooperates with the backing to contain debris resulting from fracture of the hard face.

In another embodiment, a plurality of hard faces are provided, each hard face being held in parallel and spaced apart arrangement with respect to one another. In this embodiment, a first hard face is selected to have a sufficient thickness and strength to partially disrupt an incoming projectile, while the second hard face is selected to have a thickness and strength sufficient to substantially absorb the remaining portion of the impact from the incoming projectile. Each hard face includes at least one resilient layer covering at least one surface of the hard face. In more discreet embodiments, at least one reinforcing layer is disposed behind at least one of the plurality of hard faces opposite the incoming projectile A method of manufacture of the transparent armor system generally includes providing a hard face and a backing, and substantially covering the rear surface of the hard face with the backing. A bonding layer is provided and arranged in a substantially parallel planar configuration between the hard face and the backing. The various layers are then held against one another in the substantially parallel planar configuration while the bonding layer is allowed to join the hard face to the backing.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
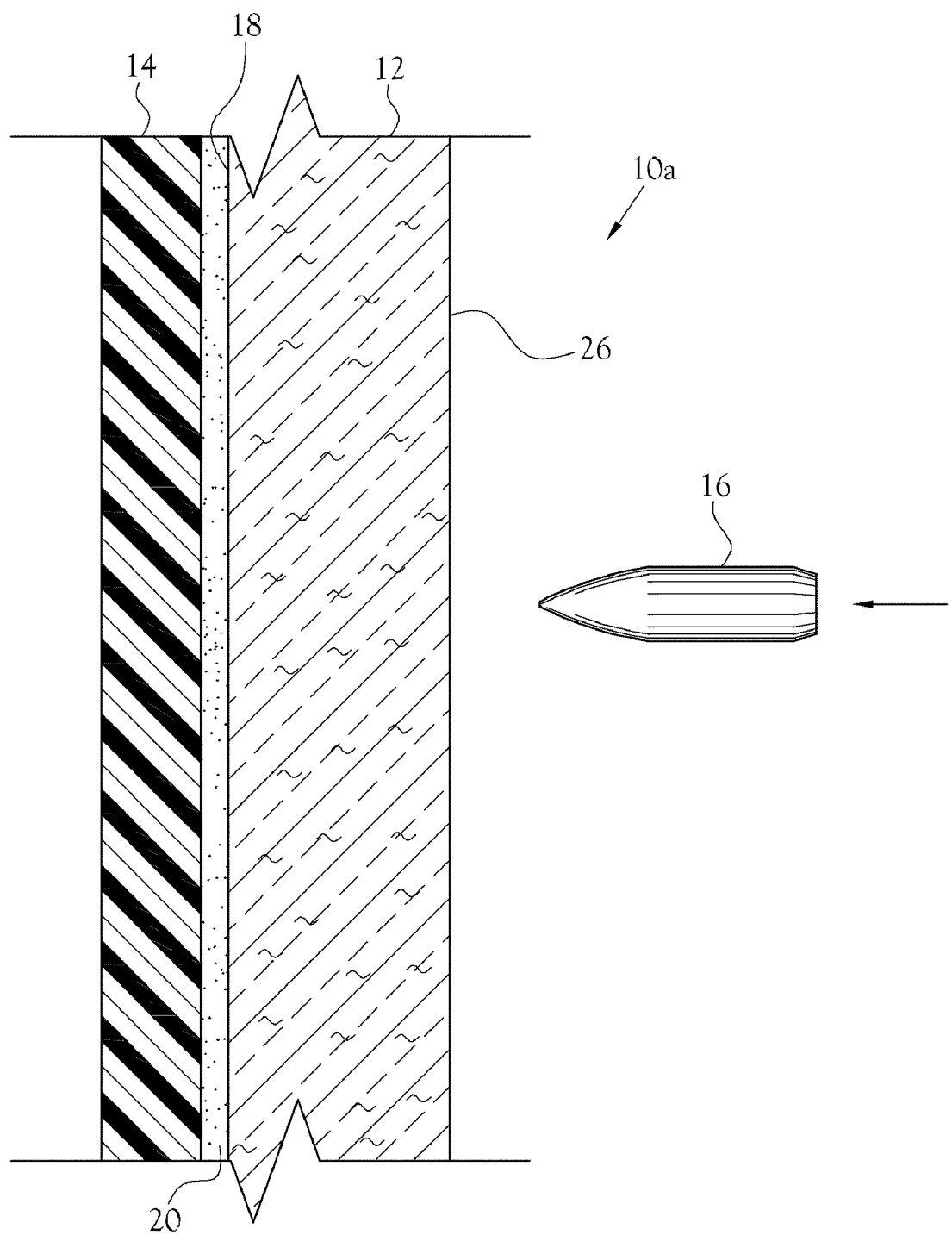
FIG. 1 is a cross-sectional view of one embodiment of the transparent armor system constructed in accordance with several features of the present invention.

A transparent armor system for limiting the transfer of impact force from a projectile and corresponding method of manufacture is disclosed herein. The transparent armor system is illustrated generally at 10 in the figures. With reference to FIG. 1, one embodiment of the transparent armor system 10a includes a hard face 12 and a resilient layer 14 covering a rear surface 18 of the hard face 12 opposite an anticipated incoming projectile 16.

The hard face 12 is defined by a layer fabricated from a glass-ceramic substance having a hardness and compressive strength sufficient to substantially absorb at least a portion of the impact from an incoming projectile 16. The hard face 12 defines a front surface 26 configured to face an incoming projectile 16 and a rear surface 18 configured opposite an incoming projectile 16. It is understood that the specific type of glass-ceramic material suitable for use in the hard face 12 depends upon the mass, velocity, and impact characteristics of the projectile to be armored against. The hard face 12 can vary in thickness, configuration, density, and weight in order to enhance the projectile stopping power.

The glass-ceramic material forming the hard face 12 is generally a material produced by traditional glass making processes but having been subsequently annealed under specific conditions leading to the nucleation and growth of crystalline bodies throughout the mass of the glass-ceramic material. In one embodiment, the crystalline bodies are composed of a lithium-alumino silicate phase which is crystallized during production of the glass-ceramic material. However, those skilled in the art will recognize other materials containing suitable crystalline bodies. Increasing the crystallization of the mass of the glass-ceramic material will, as a general rule, enhance its shielding power. It is generally accepted in the art that crystallization of up to about 60-70 percent of the mass of the glass-ceramic material can be accomplished without degradation to the transparent nature of the glass. It is further accepted in the art that decreasing the average dimensions of the individual crystals within the glass-ceramic crystallization results in a more transparent glass-ceramic material. To this extent, in one embodiment, the hard face 12 is fabricated from a glass-ceramic formed of crystals having an average dimension per crystal of less than or equal to approximately two-hundred (200) nanometers. However, crystalline structures exhibiting an average dimension per crystal greater than two-hundred (200) nanometers is contemplated. It will further be understood that other values for the percentage of crystallization and the average crystal dimensions are suitable for use in fabricating a glass-ceramic material based on the transparency requirements, the ballistic stopping power requirements, available fabrication techniques, and acceptance of discoloration, without departing from the spirit and scope of the present invention.

It has been found that mechanical properties of glass-ceramic materials at standard temperature and pressure (STP) are dissimilar from the properties of glass-ceramic materials during the very short time intervals of a ballistic event. Specifically, plastic compression resulting from ballistic impact often alters the materials properties of glass-ceramic materials during the brief period while ballistic impact occurs. As an example, in one embodiment, the hard face 12 is fabricated from a glass-ceramic material with an approximately 65% by volume non-continuous phase of crystals, each crystal having a dimension of approximately less than 100 nanometers. In this embodiment, the glass-ceramic material offers materials properties during the time period of ballistic impact that are neither anticipated nor predicted by properties of the glass-ceramic material measured under standard temperature and pressure. In this embodiment, the continuous glassy phase of the glass-ceramic material, which is a super-cooled liquid, plastically compresses and conforms for a brief time under the pressure of a ballistic impact. This plastic compression brings the crystals into closer proximal location, thus presenting a heightened ballistic resistance exhibited by the temporarily plastically compressed glass-ceramic material.

It is generally understood that the stiffness of a body is a function of the thickness of the body. Generally the thicker the hard face 12, the more effective the hard face 12 is in disrupting an incoming projectile 16. Thus, it will be understood that in selecting the overall thickness of the hard face 12, there is a weight versus effectiveness trade off in certain applications. For example, it is important that armor for personal use be lightweight, while armor for vehicle use or for building use can be of a heavier weight. Another factor to consider in deciding the specific properties of the glass-ceramic material for use in the hard face 12 is the hardness relative to the sonic velocity of the incoming projectile 16. For example, in a ballistic test of a transparent armor system incorporating a hard face having dimensions of 18.8 inches by 18.8 inches by 4.54 inches and a density of 51.8 pounds per square foot, the transparent armor system was able to completely disrupt four rounds of 7.62 millimeter rifle ammunition travelling at 3,180 feet per second. Another transparent armor system incorporating a hard face of similar dimensions, but with a density of 46.3 pounds per square foot, was shown to stop three shots of 20 millimeter fragment-simulating projectiles fired at approximately 5,000 feet per second in a 160 millimeter triangular-shaped pattern against the hard face. Another transparent armor system incorporating a hard face having dimensions of 19 inches by 19 inches by 3.49 inches and a density of 37.8 pounds per square foot was able to disrupt four rounds of 0.30-06 calibur, 165 grain APM2 rifle ammunition travelling at approximately 2,900 feet per second.

As such, it is appreciated that the fabrication of the hard face 12 from a glass-ceramic material provides an increased ability of the transparent armor system 10 to disrupt an incoming projectile 16, as compared to a conventional transparent hard face of comparable thickness. Alternatively, such fabrication of the hard face 12 from a glass-ceramic material allows a thinner and therefore more lightweight hard face 12 to provide similar disruption of an incoming projectile 16, as compared to a conventional transparent hard face.

In the illustrated embodiment of FIG. 1, the resilient layer 14 is a layer fabricated from a transparent material substantially covering the rear surface 18 of the hard face 12 such that the resilient layer 14 maintains at least simple intimate contact with the rear surface 18. The resilient layer 14 is selected to have a sufficient thickness and strength to withstand stresses imparted to the resilient layer 14 under ballistic impact of the hard face 12. The maximum stress the hard face 12 imparts to the resilient layer 14 is related to the specific yield stress of the hard face 12. Specifically, the higher the yield stress of the hard face 12, the less stress is imparted to the resilient layer 14. Furthermore, the resilient layer 14 is selected to have a refractive index sufficiently similar to the refractive index of the hard face 12 such that the transparent armor system 10 is substantially transparent. In more discreet embodiments, the resilient layer 14 is further selected to be substantially abrasion resistant. In other more discreet embodiments, the resilient layer 14 is selected to be anti-reflective to light. In one embodiment, the resilient layer 14 is a polymer material. In another embodiment, the resilient layer 14 is fabricated from silica-covered polycarbonate. In another embodiment, the resilient layer 14 is fabricated from a material selected from the group consisting of rubber, tempered glass, borosilicate glass, soda lime glass, spinel, aluminum oxynitrite, sapphire, transparent nylon, transparent acrylic, polymethyl methacrylic, and transparent polyvinylbutural. In other more discreet embodiments, the resilient layer 14 is selected to be substantially anti-reflective to light. Those skilled in the art will recognize other transparent materials having suitable strength for use in fabrication of the resilient layer 14.

Figure 2:
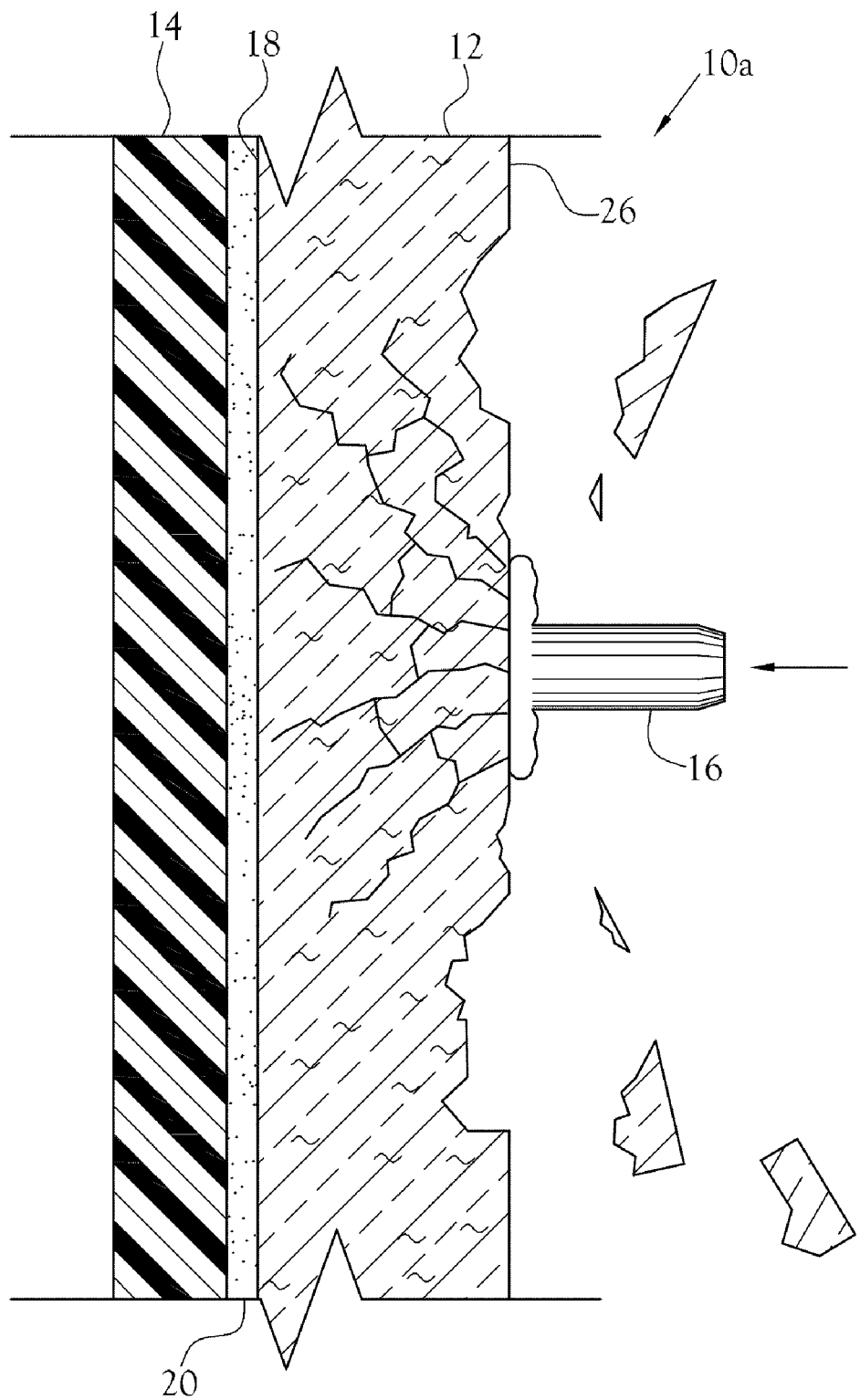
FIG. 2 is a cross-sectional view of the transparent armor system of FIG. 1, showing a projectile impacting the hard face.

FIG. 2 illustrates the transparent armor system 10*a* during the initial impact of an incoming projectile 16. As shown in FIG. 2, deformation and fracture of the hard face 12 occurs in response to forces resulting from impact by the incoming projectile 16. Of course, the degree to which the hard face 12 deforms and fractures is relative to the magnitude of the impact forces of the incoming projectile 16. The contact between the resilient layer 14 and the hard face 12 provides a means for containing debris resulting from fracture of the hard face 12, such as, for example, fracture resulting from projectile impact. As shown in FIG. 2, such debris containment serves to limit the various fractured pieces of the hard face 12 from propulsion through the resilient layer 14 and toward a target protected by the transparent armor system 10*a*. Such debris containment further serves to retain such fractured pieces substantially within the original configuration of the hard face 12, thereby improving the multi-hit performance and field durability of the transparent armor system 10*a*.

In several embodiments, such as the embodiment of FIGS. 1 and 2, a bonding layer 20 is provided to bond the resilient layer 14 to the hard face 12. The bonding layer 20 is defined by a layer of adhesive material disposed between the resilient layer 14 and the hard face 12 which is suitable to bond the resilient layer 14 to the hard face 12 while also filling surface irregularities between the various layers. Such filling of surface irregularities allows the bonding layer 20 to maintain substantially similar refractive indexes between the resilient layer 14, the bonding layer 20, and the hard face 12. The bonding layer 20 thereby promotes transparency of the combined transparent armor system 10. In more discreet embodiments, the bonding layer 20 is fabricated from a material within the family of thermoplastic bonding agents. In even more discreet embodiments, the bonding layer 20 is fabricated from a material selected from the group consisting of polyvinylbutyral (PVB), thermoplastic polyurethanes (TPU), and other such materials. However, those skilled in the art will recognize other materials suitable for fabrication of the bonding layer 20.

It has been found that use of a glass-ceramic material for the hard face 12 containing crystalline structures in the form of a lithium alumino silicate phase results in a glass-ceramic material which substantially absorbs light in at least a portion of the ultraviolet spectrum. Thus, in an embodiment using such a glass-ceramic material for the hard face 12, the bonding layer 20 is substantially protected from degradation resulting from exposure to ultraviolet radiation through the hard face 12. Those skilled in the art will recognize that other glass-ceramic materials provide similar ultraviolet radiation protection to the bonding layer 20, and such glass-ceramic materials may be used to fabricate the hard face 12 without departing from the spirit and scope of the present invention.

Moreover, it has been found that use of a glass-ceramic material for the hard face 12 containing crystalline structures in the form of a lithium alumino silicate phase results in a glass-ceramic material which is substantially transparent to light in at least a portion of the infrared and near-infrared spectrum. Thus an embodiment using such a glass-ceramic material for the hard face 12 and similarly infrared-transparent materials for the resilient layers 14 and bonding layers 20 (if any) provides a transparent armor system 10 which is at least partially transparent to infrared and near-infrared light.

It will be understood by one of ordinary skill in the art that numerous benefits are derived from a transparent armor system 10 which is at least partially transparent to infrared and near-infrared light, as compared to conventional transparent armor which is not infrared-transparent. For example, the infrared-transparent feature of the present invention provides the ability to observe objects and persons through the transparent armor system 10 using night vision technology, thermographic technology, and other such infrared optics technology.

It has further been found that glass-ceramic material exhibits a relatively low coefficient of thermal expansion, as compared to conventional borosilicate float glass materials. In certain more discreet embodiments, the bonding layer 20 is fabricated from a material exhibiting a coefficient of thermal expansion sufficiently low as to exhibit thermal expansion properties comparable to the glass-ceramic material. In other embodiments, the bonding layer 20 is fabricated from a material exhibiting adhesion sufficient to maintain shear compliance between the hard face 12 and the resilient layer 14 while the resilient layer 14 undergoes thermal expansion relative to the hard face 12 due to changes in temperature of the transparent armor system 10*a* ranging from below freezing to over 85 degrees Centigrade.

Figure 3:
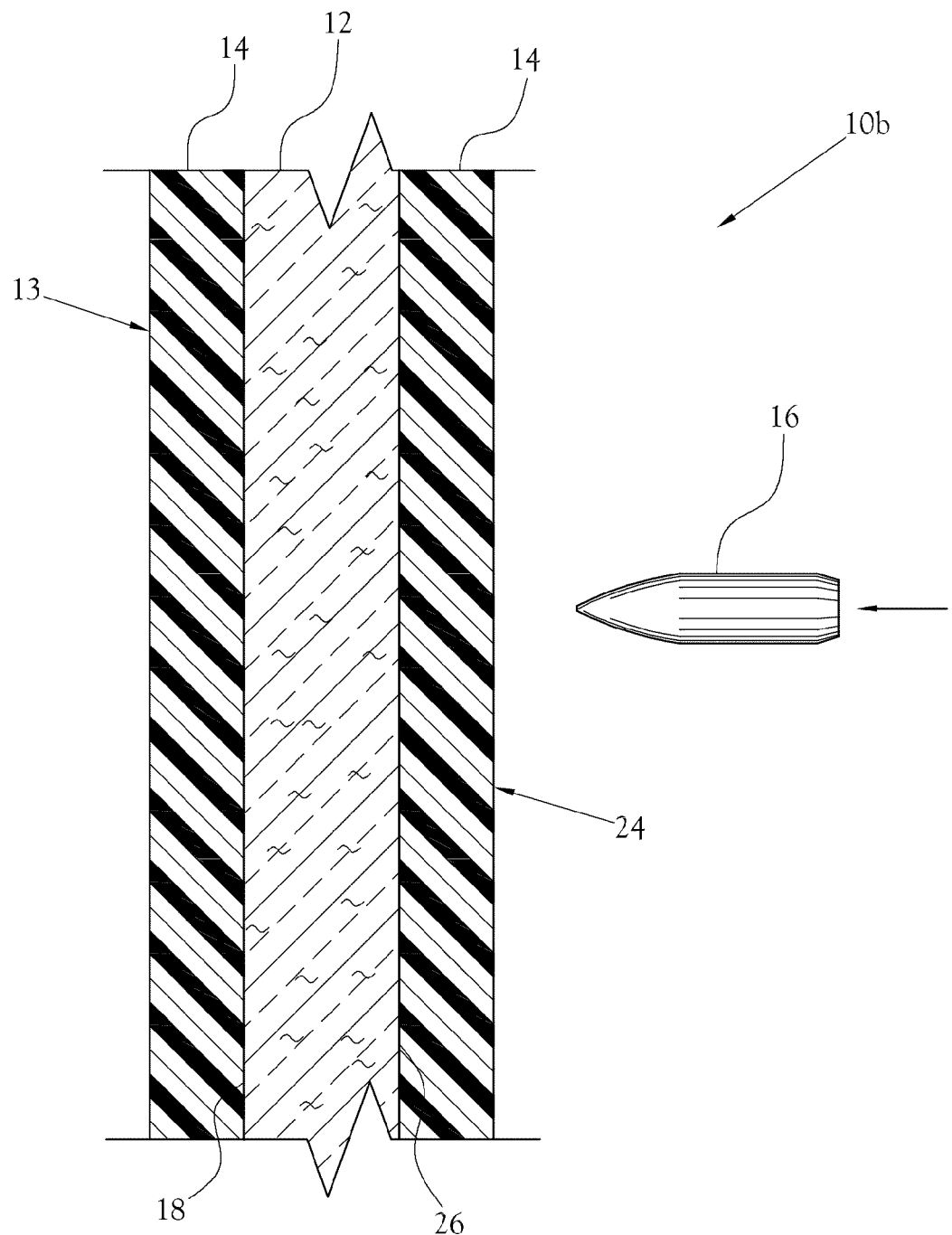
FIG. 3 is a cross-sectional view of another embodiment of the transparent armor system, in which the covering is included.

FIG. 3 illustrates another embodiment of the transparent armor system 10*b* of the present invention. In the embodiment of FIG. 3, the material for fabrication of the resilient layer 14 is selected such that the resilient layer 14 adheres directly to the hard face 12 absent the inclusion of a bonding layer. In this embodiment, the resilient layer 14 is selected from a material, such as polymer or other such material suitably formed to contour to the rear surface 18 of the hard face 12 and to fill surface irregularities of the rear surface 18 of the hard face 12, thereby laminating the resilient layer 14 directly to the hard face 12. In this way, the resilient layer 14 establishes shear compliance against the hard face 12 to maintain lamination of the resilient layer 14 to the hard face 12 throughout changes in temperature of the transparent armor system 10*b*. Those skilled in the art will recognize materials suitable for fabrication of the resilient layer 14 so as to achieve such shear compliance between the hard face 12 and the resilient layer 14.

As shown in FIG. 3, a first resilient layer 14 is laminated to the rear surface 18 of the hard face 12 to form a backing 13 for the hard face 12. An additional resilient layer 14 is laminated to the front surface 26 of the hard face 12 to form a covering 24 to the hard face 12. The two resilient layers 14 cooperate to contain debris resulting from fracture of the hard face 12. In several embodiments incorporating the covering 24, a bonding layer is provided between the hard face 12 and the covering 24 to secure the covering 24 to the hard face 12. Of course, those skilled in the art will recognize materials suitable for fabricating the covering 24 such that the covering 24 self adheres to the hard face 12, such that inclusion of the bonding layer is not necessary to accomplish the present invention.

In more discreet embodiments, the resilient layer 14 forming the covering 24 is selected to provide surface protective features, such as abrasion resistance, chemical corrosiveness resistance, and other surface protection features to the transparent armor system 10*b*. For example, in one embodiment, the covering 24 is selected from a substantially abrasion-resistant material, such as polycarbonate, tempered glass, borosilicate glass, soda lime glass, spinel, aluminum oxynitrite, sapphire, transparent nylon, transparent acrylic, polymethyl methacrylic, transparent polyvinylbutural, or other substantially abrasion-resistant thereby serving to protect the hard face 12 from scratches and blemishes resulting from day to day use. Use of polycarbonate in fabrication of the covering 24 results in a covering 24 which is an absorber of ultraviolet radiation, thereby further protecting any optional bonding layers from degradation due to ultraviolet radiation exposure in outdoor transparent armor applications. Furthermore, use of polycarbonate in fabrication of the covering 24 and backing 13 results in a covering 24 and a backing 13 which are transparent to infrared and near-infrared radiation. Those skilled in the art will recognize other suitable materials for use in fabrication of the covering 24. In one embodiment, multiple coverings 24 are provided. In this embodiment, a first covering 24 provides an abrasive resistance feature to the transparent armor system 10, while a second covering 24 provides a chemical resistance feature. In another embodiment, the covering 24 provides an anti-reflective feature to the transparent armor system 10. It will be understood that other suitable configurations for multiple coverings 24 are contemplated.

Figure 4:
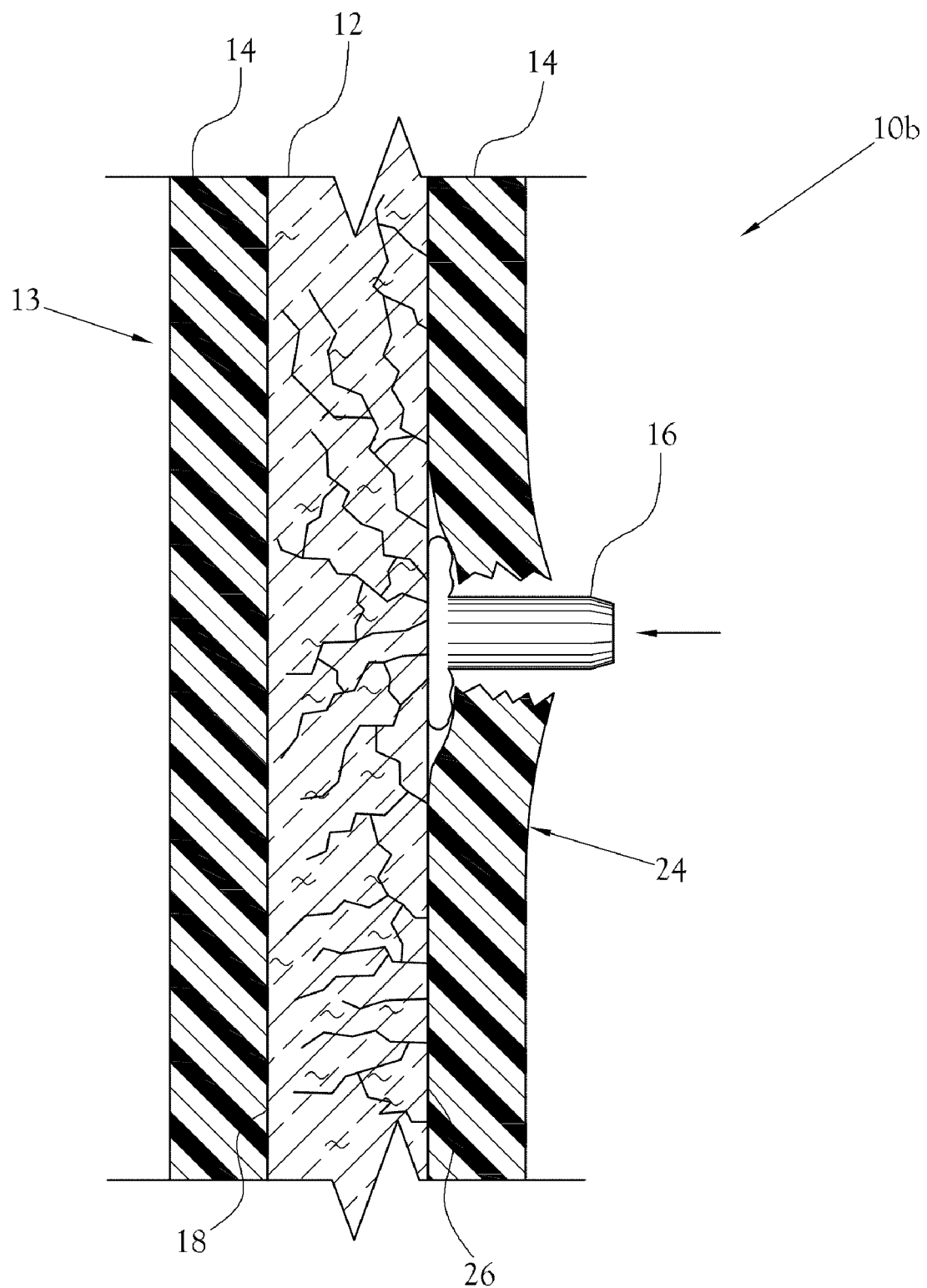
FIG. 4 is a cross-sectional view of the transparent armor system of FIG. 3, showing a projectile piercing the covering and impacting the hard face.

FIG. 4 shows an incoming projectile 16 impacting the embodiment of the transparent armor system 10b of FIG. 3. In the present embodiment, each resilient layer 14 is selected to have a sufficient thickness and strength to contain debris resulting from fracture of the hard face 12, such as, for example, fracture resulting from projectile impact. As shown in FIG. 4, upon impact of the transparent armor system 10b by the incoming projectile 16, the incoming projectile 16 pierces the covering 24 and impacts the hard face 12. Upon subjection of the hard face 12 to forces resulting from impact by the incoming projectile 16, deformation of the hard face 12 as well as fracture of the hard face 12 is contemplated. Thus, in the embodiment of FIGS. 3-4, the covering 24 cooperates with the backing 14 to further retain the various fractured pieces of the hard face 12 substantially within the original configuration of the hard face 12, thereby further improving the multi-hit performance and field durability of the transparent armor system 10b.

Figure 5:
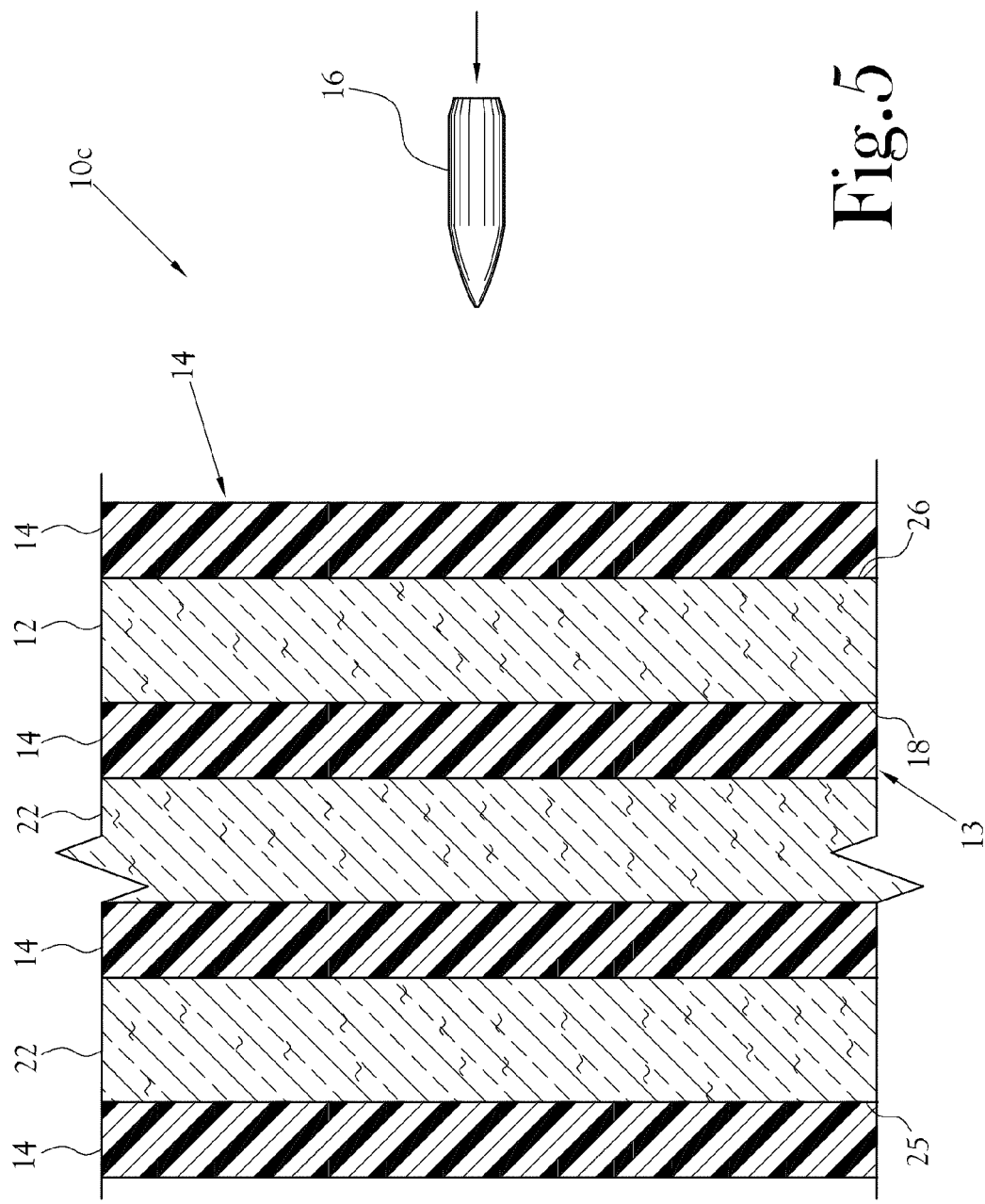
FIG. 5 is a cross-sectional view of another embodiment of the transparent armor system, in which two reinforcing layers are included.
Figure 6:
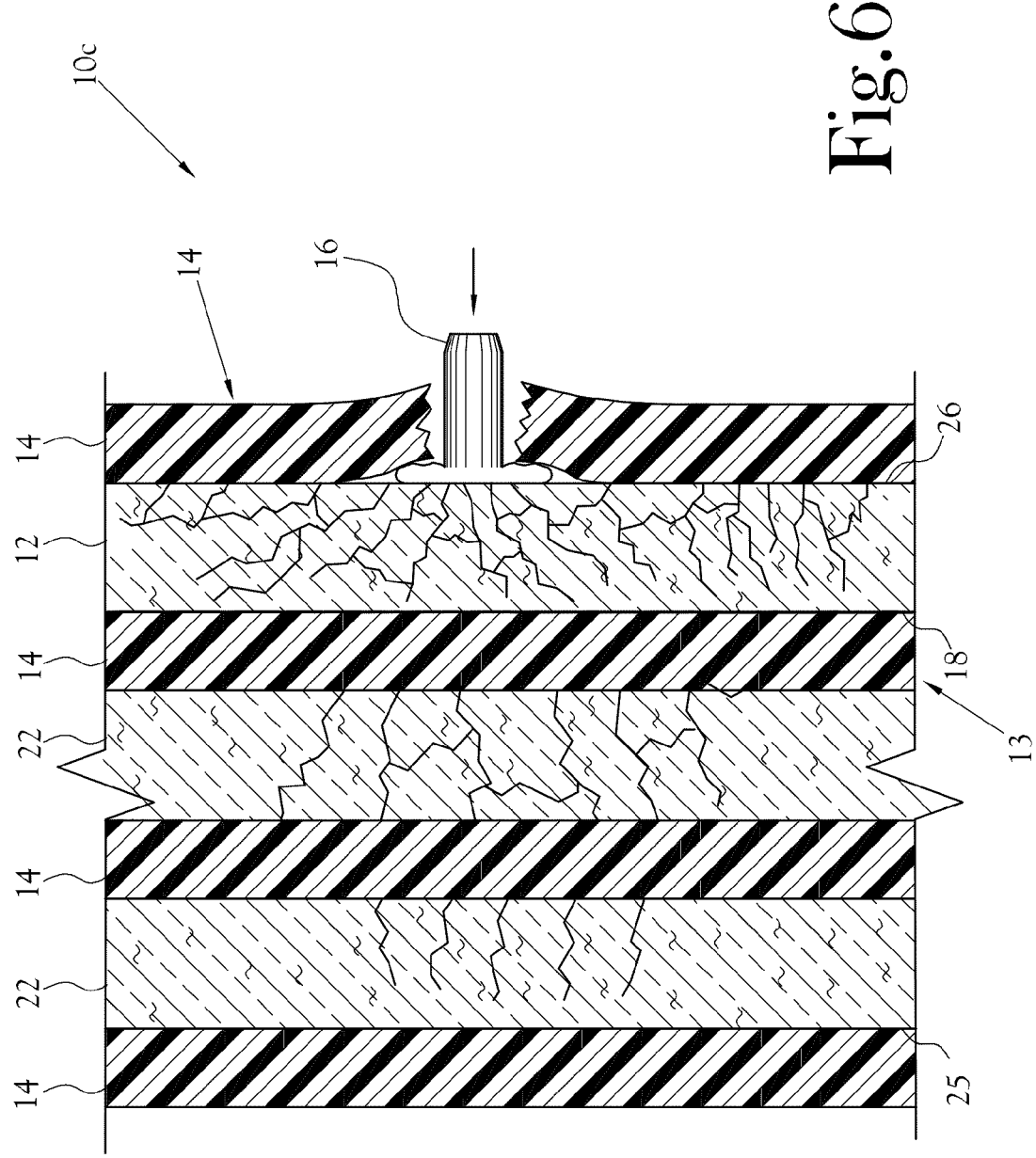
FIG. 6 is a cross-sectional view of the transparent armor system of FIG. 5, showing a projectile impacting the hard face.

In several embodiments, such as the embodiment of FIGS. 5-6, the transparent armor system 10c includes at least one reinforcing layer 22 secured along the hard face 12 opposite the front surface 26. In the embodiment of FIG. 5, a plurality of reinforcing layers 22 are laminated against the backing 13 adjacent the rear surface 18 of the hard face 12. Similarly to the hard face 12, the reinforcing layers 22 are each fabricated from a glass-ceramic substance having a hardness and compressive strength sufficient to substantially absorb at least a portion of the impact from an incoming projectile 16.

Additional resilient layers 14 are provided between each reinforcing layer 22, and along a rear surface 25 of the cooperating reinforcing layers 22. As shown in FIG. 6, the various reinforcing layers 22 serve to provide structural stability to the transparent armor system 10c and to further absorb energy transferred to the reinforcing layers 22 from the hard face 12 during structural failure of the hard face 12 resulting from ballistic impact. Each subsequent reinforcing layer 22 opposite the hard face 12 from the projectile 16 further absorbs energy transferred from the previous layer. In this configuration, it is anticipated that the amount of fracture, deformation, and other damage done to each successive layer 12, 22 decreases as the impact forces of the projectile 16 are partially absorbed by each preceding layer 12, 22. In this configuration, each resilient layer 14 provides a means for containing debris resulting from the fracture of adjacent reinforcing layers 22 and hard face 12, such as, for example, fracture resulting from projectile impact, and maintaining such debris substantially within the original configuration of the respective reinforcing layer 22 and hard face 12, thereby further improving the multi-hit performance and field durability of the transparent armor system 10c. In the illustrated embodiment of FIGS. 5 and 6, two reinforcing layers 22 with cooperating resilient layers 14 are provided. However, it will be understood that any number of reinforcing layers 22 with cooperating resilient layers 14 may be provided without departing from the spirit and scope of the present invention. Furthermore, it will be understood that the provision of a reinforcing layer 22 is not necessary to accomplish the present invention.

In certain more discreet embodiments, each resilient layer 14 is formed within the transparent armor structure 10 so as to be in tension against the hard face 12 and any reinforcing layers 22. Such tension is accomplished, for example, by selecting resilient layers 14 having coefficients of thermal expansion greater than the hard face 12 and reinforcing layers 22. It is understood in the art that the coefficient of thermal expansion of most glass-ceramic materials is equal to or near zero in temperatures ranging from −40 to 85 degrees Centigrade. In this embodiment, the resilient layers 14 are applied to the hard face 12 and reinforcing layers 22 at an elevated temperature, and thereafter allowed to cool such as to place the resilient layers 14 in tension against the hard face 12 and reinforcing layers 22. In this configuration, the resilient layers 14 cooperate to place the hard face 12 and reinforcing layers 22 into compression, thereby improving the composite strength of the transparent armor system 10c. Such compression further serves to secure various fractured pieces of the hard face 12 and reinforcing layers 22 substantially within the original configuration of the hard face 12 and reinforcing layers 22.

Figure 7:
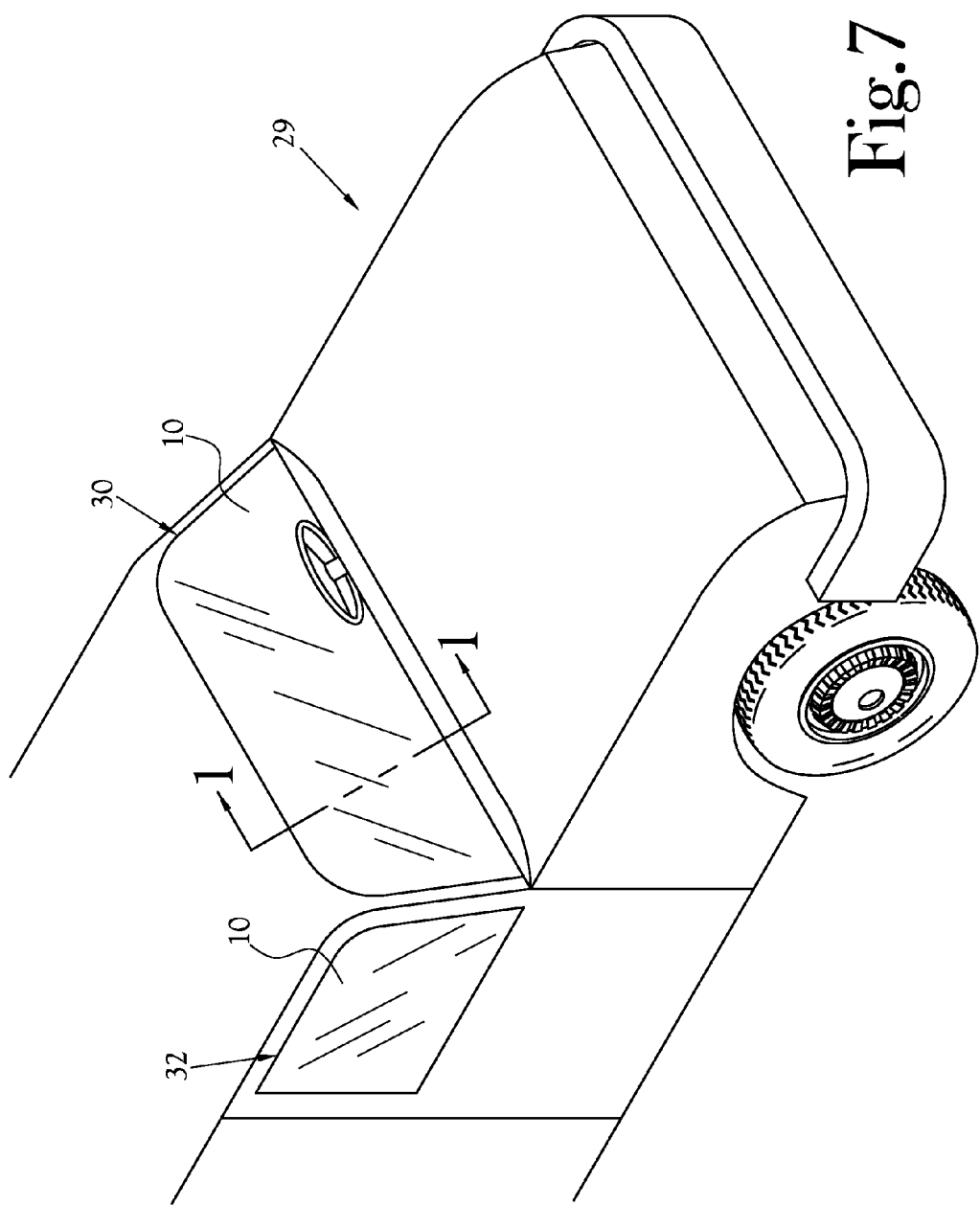
FIG. 7 is a partial perspective view of an armored vehicle having a windshield and windows fabricated from the transparent armor system.

FIG. 7 pertains to one possible application of the transparent armor system 10 of the present invention. FIG. 7 shows an armored vehicle 29 utilizing a windshield 30 and windows 32 fabricated from panels of the transparent armor system 10. Various body surfaces 28 of the armored vehicle 29 are fabricated from opaque ballistic armor structures. In this application, the windshield 30 and windows 32 fabricated from the transparent armor system 10 serve to provide protection from ballistic projectiles aimed toward the vehicle interior through the windshield 30 and windows 32 of the vehicle 29. In this way, the various panels of the transparent armor system 10 cooperate with the opaque ballistic armor structures of the armored vehicle body to form a substantially encapsulated ballistic armored shelter within the interior of the armored vehicle 29.

While the application of FIG. 7 utilizes a windshield 30 and windows 32 that are substantially planar, it will be understood by one skilled in the art that the transparent armor system 10 can be constructed to resemble numerous surface shapes, as well as numerous three-dimensional shapes. As such, it is not the intention of the applicant to restrict or in any way limit the scope of the appended claims to any specific overall shape of the transparent armor system 10. To this extent, structural shapes utilizing a hard face 12 core substantially surrounded by one or more resilient layers 14 are contemplated.

Figure 8:
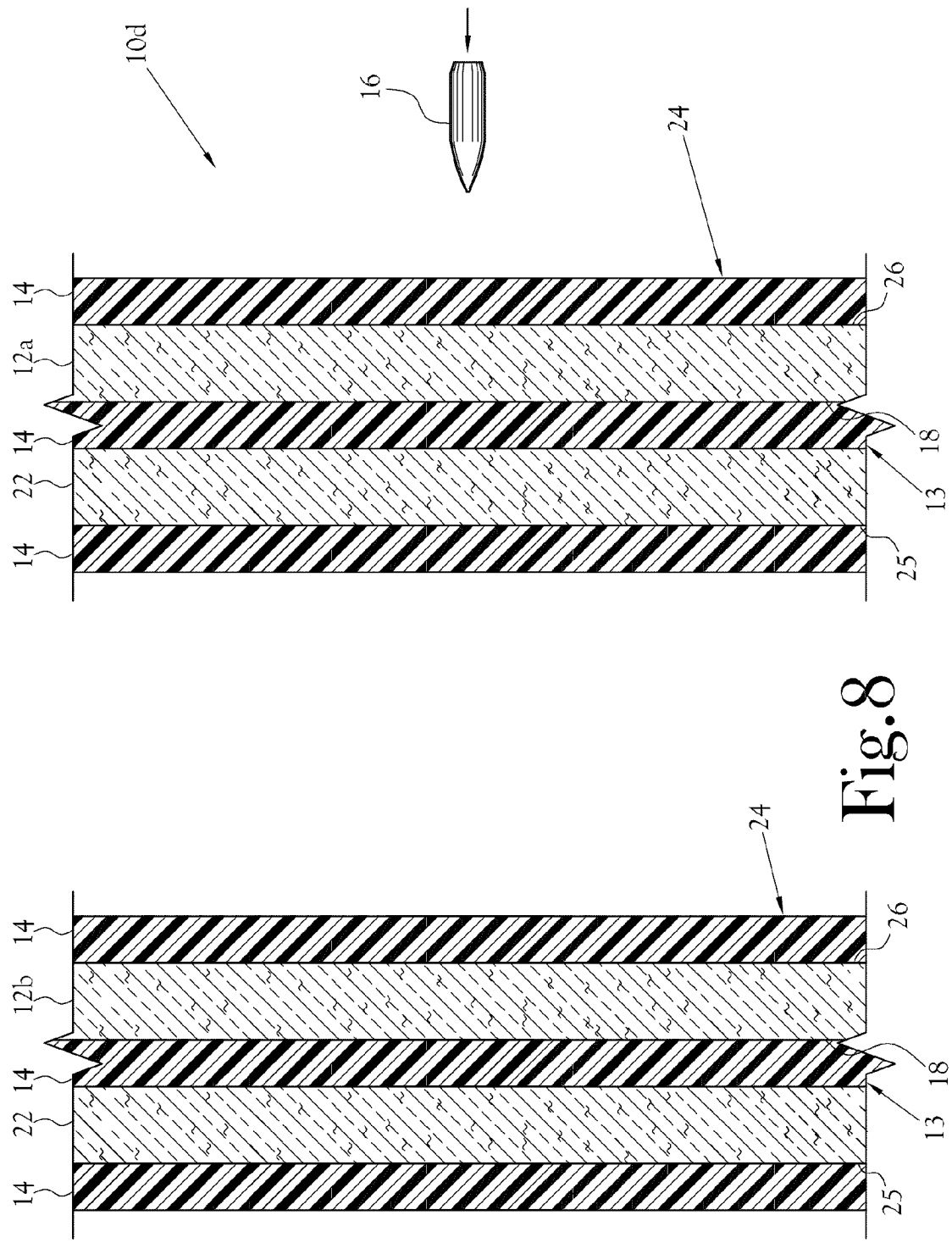
FIG. 8 is a cross-sectional view of another embodiment of the transparent armor system, in which two spaced apart hard faces are included.

In one embodiment of the transparent armor system 10d, as illustrated in FIG. 8, a plurality of hard faces are provided and secured in a parallel planar configuration and spaced apart therebetween. In the illustrated embodiment, a first hard face 12a and a second hard face 12b are provided. Each hard face 12a, 12b is provided with a resilient layer 14 laminated to the rear surface 18 of the hard face to form a backing 13 for the hard face. Each hard face 12a, 12b further includes a resilient layer 14 laminated to the front surface 26 of the hard face to form a covering 24 to the hard face. The hard faces 12a, 12b are held in a spaced apart relationship relative to one another by conventional means, such as within the confines of a double-paned window frame (not shown) or other conventional means.

In the illustrated embodiment, a plurality of reinforcing layers 22 are provided, with at least one reinforcing layer 22 being laminated against each hard face backing 13 opposite the front surface 26 of each hard face 12a, 12b. Additional resilient layers 14 are provided along the rear surface 25 of each reinforcing layer 22. Each reinforcing layer 22 cooperates with adjacent resilient layers 14 and corresponding hard face layers 12a, 12b to increase the overall rigidity of the transparent armor system 10d. In several embodiments, at least one resilient layer 14 is treated with an anti-reflective coating, such that light is discouraged from reflecting against the various layers of the transparent armor system 10d. While the illustrated embodiment depicts one reinforcing layer 22 provided for each hard face 12a, 12b, those skilled in the art will recognize that any number of reinforcing layers 22 may be provided to any hard face 12a, 12b, in numerous configurations, without departing from the spirit and scope of the present invention.

Figure 9:
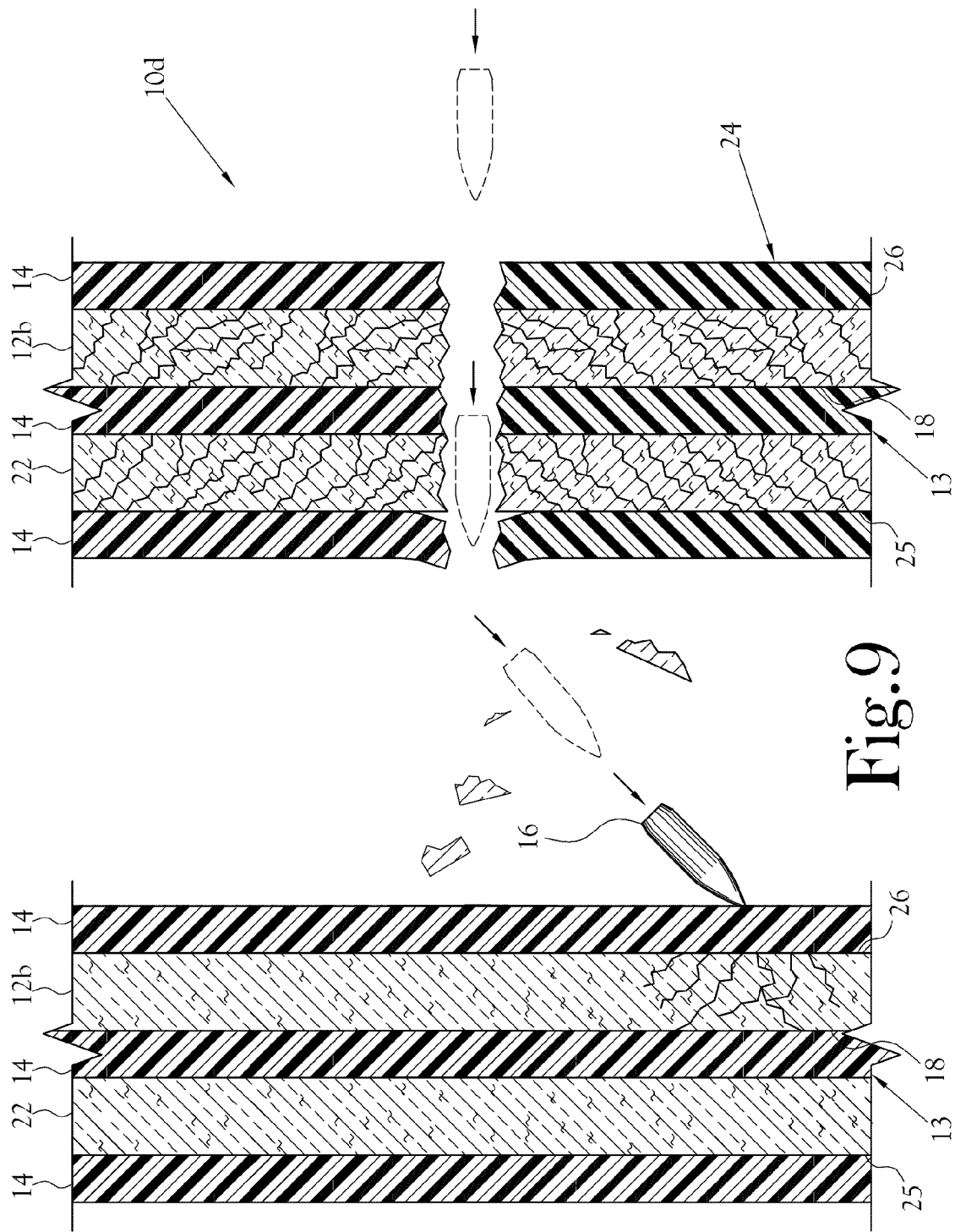
FIG. 9 is a cross-sectional view of the transparent armor system of FIG. 8, showing a projectile impacting the hard face.

FIG. 9 shows an incoming projectile 16 impacting the transparent armor system 10d of FIG. 8. Referring to FIG. 9, in the present embodiment, the first hard face 12a and cooperating reinforcing layer 22 is selected to have a sufficient thickness and strength to absorb a portion of the impact from an incoming projectile 16. As the incoming projectile 16 impacts the first hard face 12a, deformation and fracture of the portions of the first hard face 12a and cooperating reinforcing layer 22 local to the area of impact of the projectile 16 is contemplated. In several embodiments, complete disruption of the incoming projectile 16 by the first hard face 12a is contemplated. In these embodiments, the spacing between the first and second hard faces 12a, 12b allows for multiple impacts to transparent armor system 10d before damage to the second hard face 12b occurs. In other embodiments, penetration of the first hard face 12a and cooperating reinforcing layer 22 by the projectile 16 is also contemplated, such that, upon penetration of the first hard face 12a and cooperating reinforcing layer 22 by the projectile 16, at least partial disruption of the projectile 16 by the first hard face 12a and cooperating reinforcing layer 22 occurs. In several embodiments, it is contemplated that such partial disruption results in a change in the trajectory of the projectile 16 following penetration of the first hard face 12a. In more discreet embodiments, it is contemplated that the partial disruption of the projectile 16 by the first hard face 12a promotes a tendency for the projectile 16 to begin to tumble along its new trajectory.

In several embodiments, it is contemplated that partial disruption of the projectile 16 results in fracture of the projectile 16 into a plurality of pieces. Accordingly, the spacing of the first hard face 12a proximate the second hard face 12b is selected so as to allow the various fractured pieces of the projectile 16 to spread apart as the projectile 16 assumes its changed trajectory following penetration of the first hard face 12a and cooperating reinforcing layer 22, prior to impact with the second hard face 12b. It is understood that the specific spacing of the hard faces 12a, 12b proximate one another depends upon the shape, size, mass, velocity, and impact characteristics of the projectile to be armored against, as well as the thickness of the respective hard face layers and the resultant ability of the hard face layers to effect change of the trajectory of the impacted projectile 16. For example, a relatively heavy and fast-moving projectile, such as certain high-powered rifle bullets or explosive fragments, may require an increased spacing between hard faces 12a, 12b of a given thickness and composition in order to allow the projectile pieces to spread apart, while a relatively short, light, slower-moving projectile, such as certain handgun bullets, may require less spacing between the hard faces 12a, 12b before such spreading of the projectile pieces occurs.

As shown in FIG. 9, it is anticipated that, upon partial disruption of the projectile 16 by the first hard face 12a and cooperating reinforcing layer 22, and upon the resultant promotion of tumbling of the projectile 16, the partially disrupted projectile 16 impacts the second hard face 12b. To this extent, it is understood that the partial disruption of the projectile 16 by the first hard face 12a results in impact characteristics of the projectile 16 which are generally less focused along the original trajectory of the projectile 16 than those of the projectile 16 prior to impact with the first hard face 21a. Thus, the forces of impact of the partially disrupted projectile 16 are applied to an increased surface area of the second hard face 12b. Furthermore, such forces of impact of the partially disrupted projectile 16 are applied to the second hard face 12b along a trajectory which is directed at an oblique angle to the second hard face 12b. In this manner, the partial disruption of the projectile 16 by the first hard face 12a serves to decrease the ballistic effectiveness of the projectile 16 while promoting the effectiveness of the second hard face 12b at completely disrupting the projectile 16.

It will be understood by one skilled in the art that additional benefits of the various features of the embodiment of the transparent armor system 10d shown in FIGS. 8-9 will be readily apparent to one of ordinary skill in the art. To this extent, the embodiment of FIGS. 8-9 allows for the provision of a transparent armor panel having a reduced amount of material per unit area, and thus, a lighter transparent armor panel. Alternatively, the embodiment of FIGS. 8-9 allows for an increased effectiveness of the transparent armor panel as compared to a transparent armor panel of equal weight per unit area. The spaced apart relationship of first and second hard faces 12a, 12b of the present embodiment allows for the placement therebetween of a desiccant, thereby discouraging the buildup of moisture between the first and second hard faces 21a, 12b. Furthermore, the spaced apart relationship of the first and second hard faces 12a, 12b of the present embodiment allows for the placement therebetween of a thermally insulative material, such as air, argon gas, nitrogen gas, insulative liquid, or other thermally insulative material. In this respect, the embodiment of FIGS. 8-9 provides a transparent armor panel having improved thermally insulative qualities as compared to conventional transparent armor panels. Referring to FIG. 7, in the application of the present embodiment of the transparent armor system 10d to form a window of a vehicle, building or other structure, the improved insulative qualities of the present invention allow for significantly improved thermal control of the various layers of the transparent armor system 10d, in applications such as defrosting or evaporative drying of the various surfaces of the transparent armor system 10d. Other benefits of the various features of the present embodiment of the transparent armor system 10d will be recognized by one skilled in the art.

FIGS. 10-13 pertain to a method of manufacture of the transparent armor system 10, also disclosed herein. As is further discussed below, the method of manufacture generally includes providing a hard face 12 and at least one resilient layer 14, and substantially covering at least one surface 18, 26 of the hard face 12 with the resilient layer 14. In an embodiment in which a bonding layer 20 is provided, the bonding layer 20 is arranged in a substantially parallel planar fashion between the hard face 12 and the resilient layer 14. The various layers 12, 14, 20 are then held together in the substantially parallel planar configuration while the resilient layer 14 is allowed to join to the hard face 12.

Figure 10:
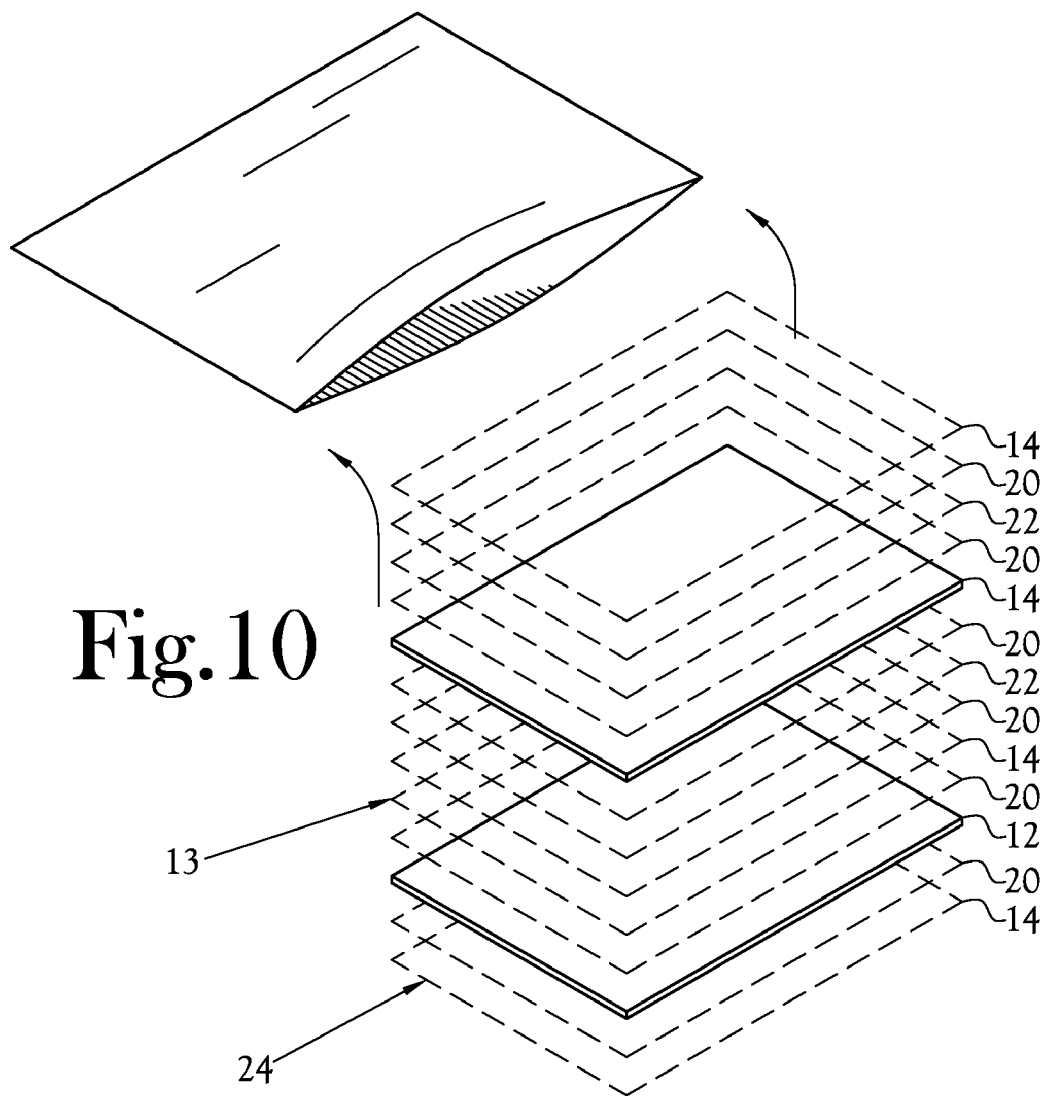
FIG. 10 is an exploded perspective view of various layers used to manufacture one embodiment of the transparent armor system, together with a substantially airtight container.
Figure 11:
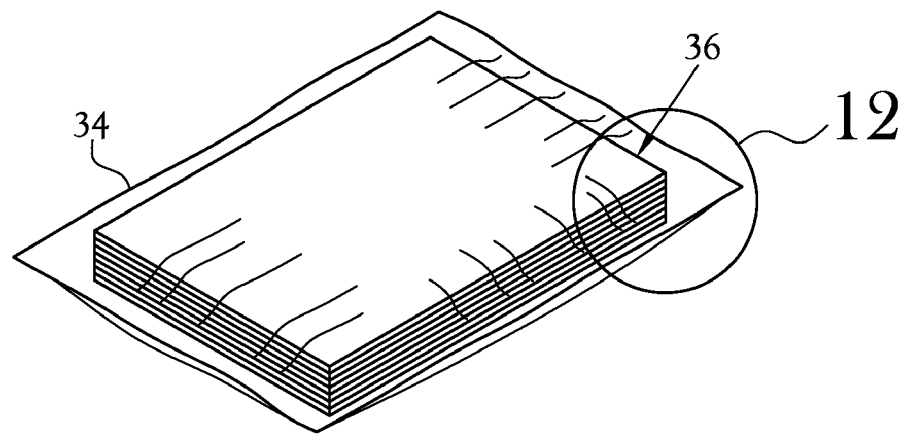
FIG. 11 is a perspective view of the materials of FIG. 10, showing the substantially airtight container containing the laminate structure, with the airtight container sealed and evacuated.
Figure 12:
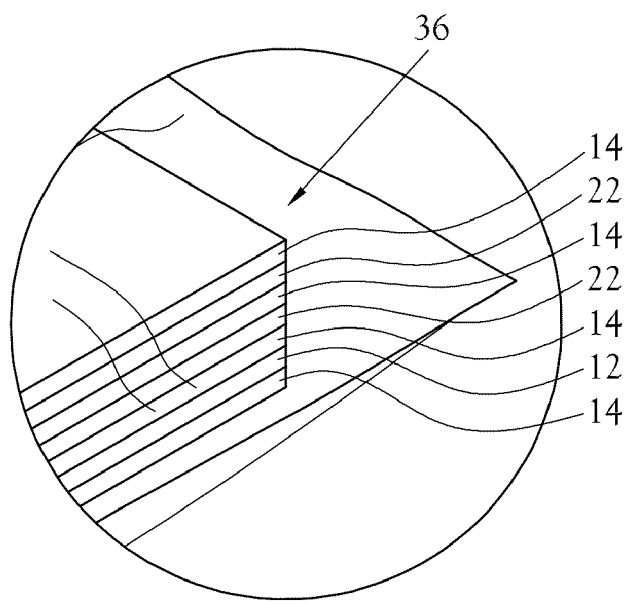
FIG. 12 is a perspective view showing one corner of the substantially airtight container of FIG. 11.

In the embodiment of the method illustrated in FIGS. 10-12, a substantially compliant and substantially airtight container 34 is provided to hold the various layers in the substantially parallel planar configuration. The container 34 is of approximate dimensions and volume to contain a panel fabricated from the transparent armor system 10. Referring to FIG. 10, a hard face 12 is provided. Optionally, a selected number of reinforcing layers 22 sufficient to allow the finished panel to accomplish the ballistic stopping ability required for the particular application are also provided. As well, a sufficient number of resilient layers 14 are provided to bond the hard face 12 and each reinforcing layer 22 together, and to form a covering 24 and a backing 13 to the transparent armor system 10.

As shown in FIG. 11, the various layers of materials are stacked in a substantially parallel planar fashion. The covering 24 and the backing 13 are arranged on opposing sides of the hard face 12, with any reinforcing layers 22 arranged opposite the backing 13 from the hard face 12, and at least one resilient layer 14 separating each successive layer. Referring to FIG. 12, the hard face 12, the reinforcing layers 22, and the various resilient layers 14 cooperate to define a laminate structure 36.

Figure 13:
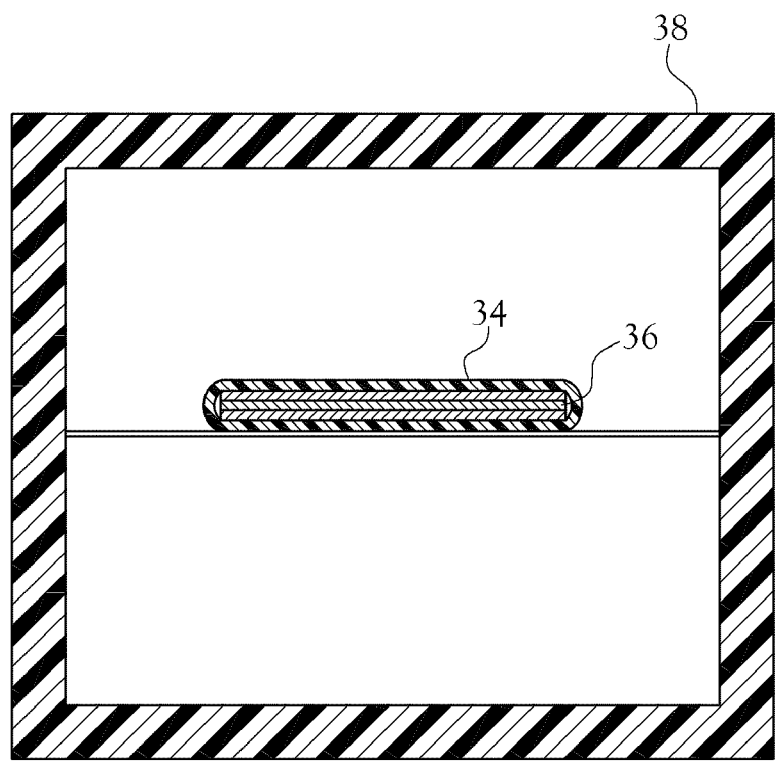
FIG. 13 is a cross-sectional view of a vessel containing the sealed and evacuated container of FIG. 11.

Referring again to FIG. 11, the laminate structure 36 is placed within the container 34. The container 34 is then sealed and evacuated to a low pressure, thereby forcing the various components of the laminate structure 36 into close proximity. As shown in FIG. 13, while still evacuated, the container 34 containing the laminate structure 36 is placed into a vessel 38. The vessel 38 is then heated, such that the laminate structure 36 is heated to a temperature in which the resilient layers 14 are thermally expanded, softened, and become adhesive. In more discreet embodiments, the resilient layers 14 are heated to the point of forming a liquid interface between the various other layers of the laminate structure 36. The liquid interface is then capable of substantially filling any surface optical defects on the various layers of the laminate structure 36 that would otherwise interfere with the overall transparency of the laminate structure 36.

Gaseous pressure is thereafter applied inside the vessel 38, exterior to the container 34. The combination of temperature of the resilient layers 14 and pressure within the vessel 38 is maintained for a sufficient time as to allow a desirable amount of lamination within the laminate structure 36, as well as any filling of surface optical defects throughout the laminate structure 36. In one embodiment, lamination within the laminate structure 36 is continued until such point that temperature reduction of the laminate structure 36 absent excessive deleterious residual stresses within the laminate structure 36 is possible. When a desirable amount of lamination within the laminate structure 36 has been reached, the temperature of the laminate structure 36 is reduced, such as to firmly set the resilient layers 14 in lamination to the hard face 12 and reinforcing layers 22, thereby forming a finished transparent armor system 10. The pressure in the vessel 38 and the vacuum in the container are then released, and the finished transparent armor system 10 is removed.

From the foregoing description, it will be understood that a transparent armor system 10 and method of manufacture has been provided. The transparent armor system provides a transparent ballistic armor structure which is capable of providing ballistic protection comparable to conventional transparent armor structures, but with reduced aerial weight as compared to the conventional transparent armor structures. The transparent armor system provides a laminate structure exhibiting optical and infrared transmission, relatively low scattering, cohesive interlaminar strength, scratch and abrasion resistance, multi-hit capability, thermal environment stability, and light weight.

Furthermore, the transparent armor system provides a transparent ballistic armor structure which is capable of providing increased ballistic protection compared to a conventional transparent armor structure of similar aerial weight. The transparent armor system offers a heightened protection against fragmentation ballistics. For example, one embodiment of the transparent armor system has been shown to stand up to the equivalent of twin 155 improvised explosive devices at three meters from the explosives. In this experiment, the rate of travel of the fragmentation ballistic projectiles was inferred to be greater than 3,000 feet per second. It is anticipated that the interlaminate layering of the transparent armor system promotes shock wave propagation delay, allowing the preservation of hard face material from damage from the shock wave often preceding an incoming projectile. Such shock wave propagation delay serves to preserve the hard face, allowing the incoming projectile to be met with an undamaged hard face.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of the applicants general inventive concept.

Having thus described the aforementioned invention, what is claimed is:

1. A transparent ballistic armor comprising:
   a hard face defining a front surface and a rear surface, said hard face being fabricated from a glass-ceramic material comprising a glass phase and a crystalline phase, said hard face having a first refractive index, said crystalline phase and said glass phase occurring in a ratio such that said hard face is substantially transparent to visible light, said crystalline phase comprising a plurality of crystals, said crystals having an average dimension such that said hard face is substantially transparent to visible light;
   a backing layer substantially covering said rear surface of said hard face, said backing layer being fabricated from a material that is substantially transparent to visible light, said backing layer having a second refractive index, said second refractive index being substantially equal to said first refractive index; and
   a covering layer covering said front surface of said hard face, said covering layer being fabricated from a polymeric material, said covering layer limiting front spall resulting from fracturing of said hard face due to ballistic impact, wherein said backing layer and said covering layer cooperate to compress said hard face.

2. An armor system for opposing an incoming projectile, said armor system comprising:
   a first hard face layer arranged substantially parallel to and spaced apart from a second hard face layer so that there is a space between said first hard face layer and said second hard face layer, each of said first and second hard face layers defining a front surface and a rear surface and each of said first and second hard face layers being fabricated from a glass-ceramic material exhibiting crystalline bodies throughout the mass of the glass-ceramic material;

a first backing layer substantially covering said rear surface of said first hard face layer and a second backing layer substantially covering said rear surface of said second hard face layer, each of said first and second backing layers having a refractive index substantially matching said refractive index of said corresponding hard face such as to allow substantial transparency of said armor system; and a first covering layer substantially covering said front surface of said first hard face, said first covering layer having a refractive index substantially matching said refractive index of said first hard face to allow substantial transparency of said armor system, wherein said first covering layer and said first backing layer cooperate to compress said first hard face.

3. The transparent ballistic armor of claim 2, wherein said crystalline bodies are fabricated from a lithium aluminosilicate.

4. The transparent ballistic armor of claim 2, wherein at least one of said first and second hard face layers comprises a crystalline phase that has a volume fraction less than or equal to approximately 70 percent.

5. The armor system of claim 2, wherein at least one of said first and second hard face layers is fabricated from a glass-ceramic material exhibiting approximately between 60 and 70 percent crystalline bodies by mass of the glass-ceramic material.

6. The armor system of claim 2, wherein said crystalline bodies exhibit an average dimension per crystal of less than approximately two-hundred (200) nanometers.

7. The armor system of claim 2 further comprising at least one reinforcing layer disposed against at least one of said first and second backing layers opposite said corresponding hard face, said at least one reinforcing layer being fabricated from a glass-ceramic material having a refractive index substantially matching said refractive index of said first and second backing layers.

8. The armor system of claim 2, further comprising a second covering layer substantially covering said front surface of said second hard face, said second covering layer having a refractive index substantially matching said refractive index of said second hard face such as to allow substantial transparency of said armor system.

9. The armor system of claim 8, wherein said second covering layer and said second backing layer cooperate to compress said second hard face.

10. An armor system for opposing an incoming projectile, said armor system comprising:
    a plurality of armor layers arranged substantially parallel to and spaced apart from one another so that there is a space between adjacent armor layers, each of said plurality of armor layers comprising:
    a plurality of glass-ceramic layers exhibiting crystalline bodies throughout the mass of the glass-ceramic layers;
    a plurality of resilient layers interspersed among each of said glass-ceramic layers; and
    a backing layer substantially covering a rear surface of at least one of said plurality of said glass-ceramic layers and a covering layer substantially covering a front surface of said at least one of said plurality of said glass-ceramic layers,
    wherein said first covering layer and said first backing layer cooperate to compress said first hard face,
    wherein each of said plurality of glass-ceramic layers, said backing layer, said covering layer, and each of said plurality of resilient layers have substantially matching refractive indices, such as to allow substantial transparency of said armor system.

11. The armor system of claim 10, wherein said each of said resilient layers is fabricated from polycarbonate material.

12. The armor system of claim 10, each of said resilient layers cooperating to compress said glass-ceramic layers.

* * * * *